United States Patent [19]

Raskin et al.

[11] Patent Number: 4,936,644
[45] Date of Patent: Jun. 26, 1990

[54] POLARIZATION-INSENSITIVE INTERFEROMETRIC WAVEGUIDE ELECTROOPTIC MODULATOR

[75] Inventors: Donald Raskin, Bronx, N.Y.; Hyun-Nam Yoon, Union, N.J.

[73] Assignee: Hoechst Celanese Corp., Somerville, N.J.

[21] Appl. No.: 365,589

[22] Filed: Jun. 13, 1989

[51] Int. Cl.$^5$ ............................ G02B 6/10; G02F 2/00
[52] U.S. Cl. .............................. 350/96.14; 350/96.12; 350/96.13
[58] Field of Search ............... 350/96.12, 96.13, 96.14, 350/96.15

[56] References Cited

U.S. PATENT DOCUMENTS

| | | | |
|---|---|---|---|
| 4,070,094 | 1/1978 | Martin | 350/96.14 |
| 4,288,785 | 9/1981 | Papuchon et al. | 350/96.14 |
| 4,683,448 | 7/1987 | Duchet et al. | 350/96.14 |
| 4,709,978 | 12/1987 | Jackel | 350/96.14 |
| 4,763,974 | 8/1988 | Thaniyavarn | 350/96.14 |
| 4,767,169 | 8/1988 | Teng et al. | 350/96.14 |
| 4,776,657 | 10/1988 | Reeder | 350/96.13 |

*Primary Examiner*—John D. Lee
*Assistant Examiner*—Phan T. Heartney
*Attorney, Agent, or Firm*—Depaoli & O'Brien

[57] ABSTRACT

In one embodiment this invention provides a polarization-insensitive interferometric waveguide electrooptic modulator device. In a Mach-Zender type of waveguide geometry, each of the divergent optical paths has a set of electrodes, one of which applies a horizontal electric field and the other a vertical electrical field, respectively, to a nonlinear optically responsive polymeric medium in the optical paths. The polymer medium section between each set of electrodes has a noncentrosymmetric molecular orientation parallel to the respective electric fields.

23 Claims, 1 Drawing Sheet

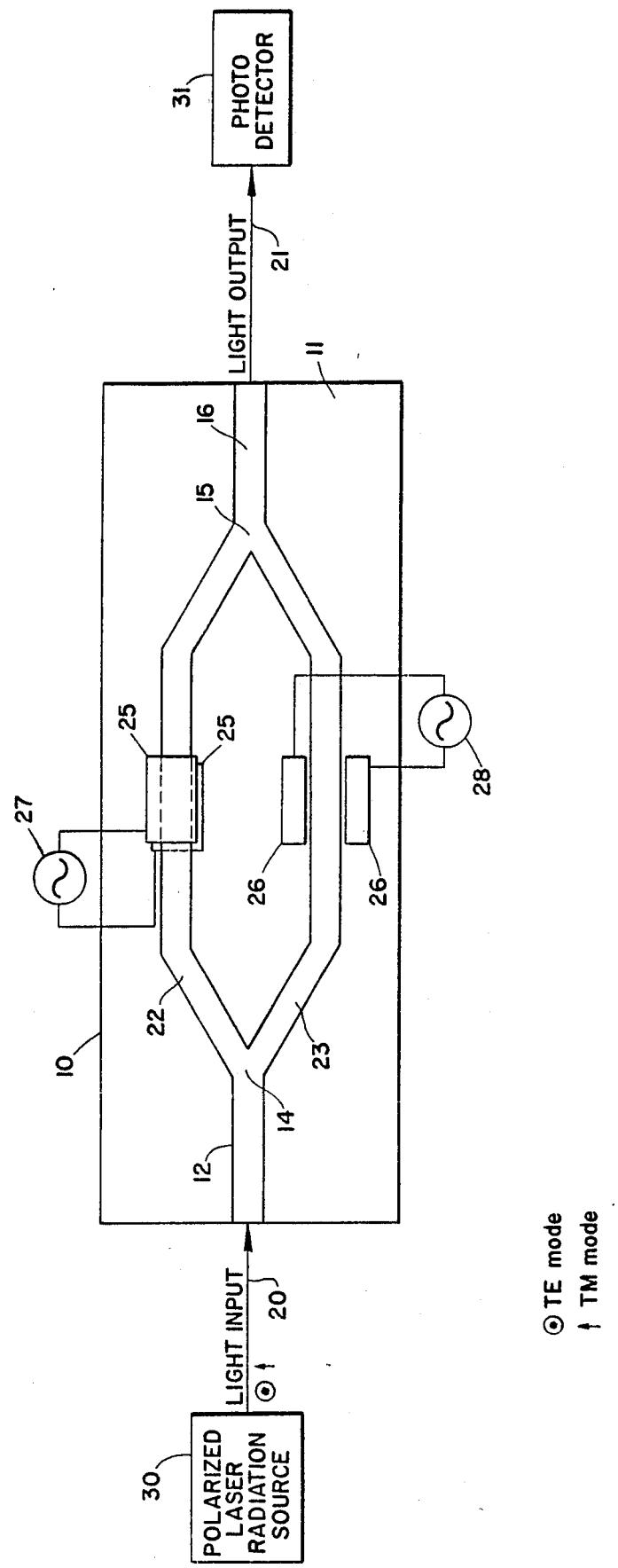

POLARIZATION-INSENSITIVE INTERFEROMETRIC WAVEGUIDE ELECTROOPTIC MODULATOR

CROSS-REFERENCE TO RELATED APPLICATIONS

The subject matter of this patent application as related to that disclosed in copending patent application Ser. No. (Docket CEL-87-70), filed Ser. No. 366,047, filed June 13, 1989.

BACKGROUND OF THE INVENTION

Electrooptic intensity modulators utilizing bulk inorganic crystals are well-known and widely utilized. Waveguide electrooptic modulators are a more recent development, and are described in literature such as Applied Physics Letters, 21, No. 7, 325 (1972); 22, No. 10, 540 (1973); and U.S. Pat. Nos. 3,586,872; 3,619,795; 3,624,406; 3,806,223; 3,810,688; 3,874,782; 3,923,374; 3,947,087; 3,990,775; and references cited therein.

One of the principal advantages of an optical waveguide configuration as contrasted to bulk crystals is that much lower electrical potentials and powers may be used with the optical waveguide configuration, and faster modulation rates also may be realized. Both of these operative characteristics are necessary to achieve high speed operation of such electrooptic modulators.

A thin film waveguide electrooptic modulator can operate employing one of several modulating mechanisms, e.g., Mach-Zehnder interferometry, directional coupling, Y junction, cross-bar switching, or rotation of the optical polarization.

The guided-wave Mach-Zehnder interferometric modulator is a well-known optical device which has been described in literature such as "Multigigahertz-Lumped-Element Electrooptic Modulator," by R. A. Becker, IEEE Journal of Quantum Electronics, Vol. QE-21, No. 8, Aug. 1985, pp. 1144–1146; and "Guided-Wave Devices for Optical Communication," by R. C. Alferness, IEEE Journal of Quantum Electronics, Vol. QE-17, No. 6, June 1981, pp. 946–959.

The interferometric modulator consists of a single input waveguide, an input branching region for splitting the input light into beams of approximately equal power between two branch waveguides, an output branching region for recombining the propagating light power in the two branch waveguides, and an output waveguide. By effecting a phase shift in one branch waveguide relative to the other, the combined output light power is between zero and a value close to the input power level, depending upon the magnitude of the phase shift. Such phase shifts are effected by means of electrodes disposed on the substrate of the optical waveguide proximate to one or both of the branch waveguides. When a voltage is applied, the electrooptic effect changes the refractive index of the proximate branch waveguide changing the optical path length, thereby effecting a phase change in the branch. By keeping the branch waveguides sufficiently apart to prevent optical coupling between the branches which would degrade performance, voltage variations are transformed into the phase changes and thus into amplitude variations in the light output power level. By modulating the electrode voltage with an analog or digital information signal, the output light power is similarly modulated and can be coupled onto a fiber waveguide for transmission.

There are other factors of critical concern in the design and fabrication of optical waveguides. The polarization properties of integrated optical switches and modulators are of great importance in determining the utility of these devices in an optical data transfer system employing fiber transmission lines. In particular, these devices must perform efficient and complete switching of light, without regard to its state of polarization. This requirement arises because linearly polarized light coupled into single-mode circular fibers suffers a rapid conversion to other polarization states. Light coupled from a fiber therefore usually possesses an unknown elliptical polarization, and both transverse electric (TE) and transverse magnetic (TM) modes will be excited in the integrated optical circuit.

Polarization-independent optical switches and modulators are described in U.S. Pat. Nos. 4,243,295; 4,291,939; 4,514,046; 4,674,829; 4,756,588; and references cited therein. The known polarization-independent waveguide devices all are constructed with inorganic waveguide channels such as crystalline $LiNbO_3$, $LiTaO_3$, GaAs or CdSe.

For a low voltage operating electrooptic modulator, highly responsive electrooptical media are required. $LiNbO_3$ has been an important inorganic species for waveguide electrooptic modulator construction. However, there are certain inherent disadvantages in the use of $LiNbO_3$ or other inorganic crystal in an electrooptic modulator, such as the limitation of the input optical power and operational wavelength due to the inherent photorefractive effect.

It is known that organic and polymeric materials with large delocalized $\pi$-electron systems can exhibit electrooptic and nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington D.C. 1983.

Organic nonlinear optical medium in the form of transparent thin substrates are described in U.S. Pat. Nos. 4,536,450; 4,605,869; 4,607,095; 4,615,962; and 4,624,872.

The above recited publications are incorporated herein by reference.

There is continuing research effort to develop new nonlinear optical organic media and electrooptic devices adapted for laser modulation, information control in optical circuitry, and the like. The potential utility of organic materials with large second order and third order nonlinearities for very high frequency application contrasts with the bandwidth limitations of conventional inorganic electrooptic materials.

Accordingly, it is an object of this invention to provide a novel electrooptic modulator.

It is another object of this invention to provide an interferometric electrooptical modulator which contains an organic nonlinear optical component.

It is a further object of this invention to provide a polarization-insensitive polymeric thin film waveguide electrooptic amplitude modulator.

Other objects and advantages of the present invention shall become apparent from the accompanying description and drawing.

SUMMARY OF THE INVENTION

One or more objects of the present invention are accomplished by the provision of a polarization-insensitive interferometric waveguide electrooptic modulator comprising:

a. first and second waveguide channels diverging from a common light input to form co-extensive channels, and reconverging to a common light output, wherein the waveguide channels are composed of an electrooptically responsive organic medium;

b. a first set of spaced electrodes positioned in proximity along the first channel to facilitate the application of a horizontal electric field to the first channel organic medium, wherein the organic medium zone between the spaced electrodes has a noncentrosymmetric molecular orientation which is parallel to the direction of an applied horizontal electric field; and c. a second set of spaced electrodes positioned in proximity along the second channel to facilitate the application of a vertical electric field to the second channel organic medium, wherein the organic medium zone between the spaced electrodes has a noncentrosymmetric molecular orientation which is parallel to the direction of an applied vertical electric field.

In another embodiment this invention provides a thin film interferometric electrooptic waveguide device for polarization-insensitive modulation of light wave amplitude which comprises:

a. first and second waveguide channels diverging from a common light input to form co-extensive channels, and reconverging to a common light output, wherein the waveguide channels are composed of a thermoplastic polymer medium which exhibits nonlinear optical response;

b. a first set of spaced electrodes positioned in proximity along the first channel to facilitate the application of a horizontal electric field to the first channel polymer medium, wherein the polymer medium zone between the spaced electrodes has a noncentrosymmetric molecular orientation which is parallel to the applied horizontal electric field;

c. a second set of spaced electrodes positioned in proximity along the second channel to facilitate the application of a vertical electric field to the second channel polymer medium, wherein the polymer medium zone between the spaced electrodes has a noncentrosymmetric molecular orientation which is parallel to the applied vertical electric field;

d. voltage sources for the said sets of electrodes; and e. a coherent optical radiation means for introducing optical radiation into the waveguide device.

In another embodiment this invention provides a process for fabricating a Mach-Zehnder interferometric electrooptic waveguide device which comprises:

(1) forming a transparent optical waveguiding thin film on a supporting substrate, wherein the thin film comprises an organic medium which exhibits nonlinear optical response, and the thin film has a configuration of first and second waveguide channels diverging from a common light input junction to form co-extensive light paths, and reconverging to a common light output junction;

(2) positioning a first set of spaced electrodes in proximity along the first channel light path to facilitate the application of a horizontal electric field to the channel organic medium;

(3) positioning a second set of spaced electrodes in proximity along the second channel light path to facilitate the application of a vertical electric field to the channel organic medium;

(4) heating the thin film to mobilize the channel polymer molecules;

(5) applying voltage to the respective sets of electrodes to form electric fields, wherein the first channel set of electrodes induces a noncentrosymmetric orientation of polymer molecules parallel to the direction of the applied horizontal electric field, and the second channel set of electrodes induces a noncentrosymmetric orientation of polymer molecules parallel to the direction of the applied vertical electric field; and (6) cooling the thin film while maintaining the applied electric fields, and thereby providing two stable electric field-induced zones of polymer molecular orientation which exhibit second order nonlinear optical response.

In a further embodiment this invention provides a method of modulating electromagnetic radiation which comprises:

(1) introducing an optical beam of arbitrary polarization into a polarization-insensitive waveguide device which has been designed and constructed in accordance with the present invention;

(2) applying modulating voltage to the respective sets of electrodes in proximity on a channel optical path to produce the same phase modulation for the transverse electric mode and the transverse magnetic mode of waveguided optical radiation propagating through the optical path; and (3) transmitting the modulated optical radiation to a photodetector means; wherein the light intensity of the transmitted optical radiation varies as a function of the phase shift between the two interferometric waveguiding channels of the device.

In a present invention interferometric waveguide device, the propagation constant of a linearly polarized light beam in each of the waveguide channels is changed by means of a vertical electric field and a horizontal electric field applied separately to the respective waveguide channels. The difference in the propagation speed of light in the two channels produces an electrically controlled phase shift. The output light intensity varies with the phase shift, and therefore is modulated by the applied voltage through the electrooptical effect.

The polarization-insensitive character of the light modulation is achieved by balancing the voltages of the two parallel sets of electrodes separately situated on the respective waveguide channels, so as to effect equal phase modulation of the TE and TM modes with the horizontal and vertical electric fields.

For a typical electrode separation of 20 microns, and an electrode length of one centimeter, the voltage normally will vary in the range between about 0-50 volts, and the frequency of the applied field will vary between DC and about one hundred gigahertz.

A present invention electrooptic modulator is characterized by a parallel configuration of two sets of electrodes. This is advantageous in comparison with a corresponding modulator which has two sets of electrodes in series on the same channel of a Mach-Zehnder interferometric modulator. The present invention parallel electrode geometry enables more compact and simpler polarization-insensitive modulator design and construction. A present invention modulator is adaptable for traveling wave designs required for high rate modulation of light.

BRIEF DESCRIPTION OF THE DRAWING

FIG. 1 is a schematic drawing of an integrated optical Mach-Zehnder interferometric electrooptic modulator in accordance with the present invention.

DESCRIPTION OF THE PREFERRED EMBODIMENT

Referring to FIG. 1, interferometer 10 consists of a transparent nonlinear optical polymeric film component 11 on a supporting substrate. Film 11 has an incorporated geometry of an input optical waveguide 12 that Y branches at 14 to split a randomly polarized optical power light input 20 between light path channel 22 and light path channel 23. The light propagating along channels 22 and 23 reconverges through Y branches at 15, and exits through waveguide 16 as light output 21. The polymeric film of the waveguide channels has a higher index of refraction than the polymeric film which is contiguous with the waveguide channels, and also higher than buffer coatings if they are utilized as protective layers.

Electrodes 25 are connected to voltage source 27, and are activated to apply a vertical electric field to channel 22. Electrodes 26 are connected to voltage source 28, and are activated to apply a horizontal electric field to channel 23. The polymeric film between electrodes 25 in channel 22 has a stable molecular orientation which is parallel to the vertical electric field applied by electrodes 25. The polymeric film between electrodes 26 in channel 23 has a stable molecular orientation which is parallel to the horizontal electric field applied by electrodes 26.

In an operating mode, device 10 is utilized in combination with laser radiation source 30 of arbitrary polarization which provides input laser beam 20; and with photodetector 31 which functions to convert output signal 21 to a reconstructed electrical signal.

The input coherent electromagnetic radiation preferably is a laser beam such as a semiconductor 600-1600 nm output.

The organic film-supporting substrate not illustrated in FIG. 1 can be constructed of any convenient nonconducting medium such a plastic, glass or silicon.

The thin film organic waveguiding medium of the invention electrooptic device is transparent, and either isotropic or anisotropic in physical properties, and exhibits nonlinear optical response.

A typical thin film organic medium comprises a blend of a polymer host and a guest component. The electrooptical properties of the thin film can be controlled by the guest component alone, or both the host and the guest components can exhibit nonlinear optical susceptibility.

Illustrative of suitable host polymers are poly(methyl methacrylate), cellulose acetate, polysiloxane, polyacrylamide, polyacrylonitrile, and the like.

Illustrative of suitable guest compounds are 4-nitroaniline, 2-methyl-4-nitroaniline, 4-N,N-dimethylamino-4'-nitrostilbene (DANS), and the like.

Other suitable nonlinear optically active guest compounds are illustrated by quinodimethane structures corresponding to the formulae:

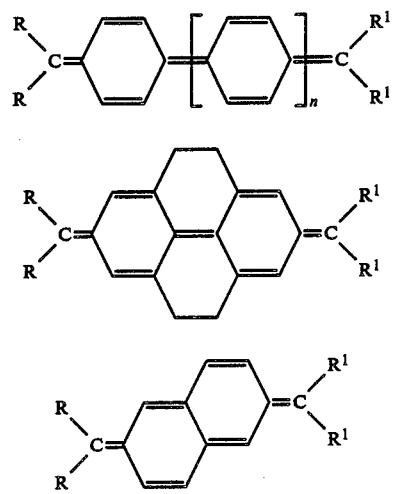

where n is an integer with a value between about 0-3; R and $R^1$ are substituents selected from hydrogen and aliphatic alicyclic and aromatic groups containing between about 1-20 carbon atoms, and at least one of the R substituents is an electron-donating group, and at least one of the $R^1$ substituents is an electron-withdrawing group.

Illustrative of nonlinear optically active quinodimethane species are 7,7-di(n-hexyldecylamino)-8,8-dicyanoquinodimethane; 13,13-diamino-14,14-dicyanodiphenoquinodimethane; 13,13-di(dimethylamino)-14,14-dicyanodiphenoquinodimethane; 13,13-di(n-hexadecylamino)-14,14-dicyanodiphenoquinodimethane; 13,13-ethylenediamino-14,14-dicyanodiphenoquinodimethane; 13,13-di(dimethylamino)-14,14-dicyano-4,5,9,10-tetrahydropyrenoquinodimethane; 13,13-di(n-hexadecylamino)-14,14-dicyano-4,5,9,10-tetrahydropyrenoquinodimethane; and the like.

The synthesis of quinodimethane compounds as listed above is described in U.S. Pat. Nos. 4,640,800 and 4,707,305; incorporated herein by reference.

The term "electron-donating" as employed herein refers to organic substituents which contribute electron density to the $\pi$-electron system when the conjugated electronic structure is polarized by the input of electromagnetic energy.

The term "electron-withdrawing" as employed herein refers to electronegative organic substituents which attract electron density from the $\pi$-electron system when the conjugated electron structure is polarized by the input of electromagnetic energy.

A particular host polymer is selected for ease of fabrication, optical properties, and compatibility with the organic guest component. The guest component typically will constitute between about 5-60 weight percent of a thin film waveguide guest/host medium.

A polymer which exhibits electrooptical response can be employed as a host component, or it can be utilized as a sole component. This type of organic component is illustrated by thermoplastic polymers which are characterized by a recurring monomeric unit corresponding to the formula:

where P' is a polymer main chain unit, S' is a flexible spacer group having a linear chain length of between about 0–20 atoms, M' is a pendant group which exhibits a second order nonlinear optical susceptibility $\beta$, and where the pendant groups comprise at least about 10 weight percent of the polymer, and the polymer has a glass transition temperature above about 40° C.

Thermoplastic side chain polymers corresponding to the above formula can be either isotropic or liquid crystalline in physical properties. Suitable side chain polymers are described in U.S. Pat. No. 4,694,066. Illustrative of side chain polymers are poly[6-(4-nitrobiphenyloxy)hexyl methacrylate], poly(L-N-p-nitrophenyl-2-piperidinemethyl acrylate), and stilbene-containing polymers such as:

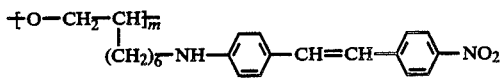

A copolymer (50/50) of methylacrylate/4-(methacryloyloxy-2-ethoxy-4'-nitrostilbene is a preferred type of side chain polymer.

A present invention device has a waveguide section in each of two channel optical paths which has an external field-induced alignment of molecular dipoles, such as nonlinear optically active guest molecules, or nonlinear optically active pendant side chains of polymers of the type described above.

Poling of a thin film waveguide medium can be accomplished conveniently by heating the medium near or above its melting point or glass transition temperature, then applying a DC electric field (e.g., 50–500 V/$\mu$m) to the medium to align molecular dipoles in a uniaxial orientation. The medium then is cooled while the medium is still under the influence of the applied DC electric field. In this manner a stable and permanent molecular orientation is immobilized in a rigid structure, such as between the pairs of electrodes shown in FIG. 1.

Electrode pairs 25 and 26 in FIG. 1 can be a strip coating of a suitable conducting material such as aluminum, silver, gold, copper, indium-tin oxide, indium titanate, and the like, and are connected to controllable DC or AC power sources 27 and 28.

The thin film waveguide layer 11 in FIG. 1 can be composited with the supporting substrate by conventional fabricating techniques such as spin coating, spraying, Langmuir-Blodgett desposition, sputtering, and the like, as appropriate for the respective materials.

The following example is further illustrative of the present invention. The device components are presented as being typical, and various modifications in design and operation can be derived in view of the foregoing disclosure within the scope of the invention.

EXAMPLE

This Example illustrates the construction and operation of a polarization-insensitive waveguide electrooptic modulator in accordance with the present invention as represented in FIG. 1.

A commercially available silicon dioxide-coated silicon wafer is placed in a Varian electron beam vacuum deposition system. A 0.1 $\mu$m layer of 99.999% purity aluminum is deposited on the wafer.

AZ-1518 positive photoresist (Hoechst) is spin-coated on the aluminum-coated wafer with a Solitec model 5100 coater. A 1.5 $\mu$m photoresist coating is achieved by spinning at 5000 rpm for 30 seconds. The photoresist coating is dried in a vacuum oven at 90° C. for 30 minutes.

The photoresist coating is patterned in the form of lower electrode 25 in FIG. 1 by placing the wafer in contact with a mask of the desired configuration in a Karl Suss model MJB3 mask aligner, and exposing the marked coating to 405 $\mu$m radiation (120 mJ/cm$^2$).

The mask is removed, and the patterned photoresist is developed with AZ-400k Developer in water (1:1) over a period of 45 seconds, and the developing cycle is terminated by washing with deionized water.

The photoresist-coating of the wafer is baked in a vacuum oven at 120° C. for 30 minutes. The exposed aluminum pattern is etched with type A etchant (Transene Co.) at 50° C. for 20 seconds, and the etched surface is rinsed with deionized water.

The aluminum electrode surface of the wafer is covered with a thin (1000 A) protective polysiloxane layer, followed by a 2.0 $\mu$m cladding layer of Master Bond UV11-4M1 epoxy (Master Bond Inc.) by spin-coating at 4000 rpm for 30 seconds, and the cladding layer is cured with a mercury arc lamp discharge with 20 mw/cm$^2$ of 365 nm light for one minute.

After curing, the wafer is exposed to reactive ion etching for 5 seconds to improve surface adhesion of subsequent layers in a Plasmafab 340 etcher (Electrotech Co.). The etching conditions are five standard cubic centimeters per minute of O$_2$ flowing at 15 mtorr pressure, with 30 watts/6" diameter platten of 13.56 MHz r.f. power.

A nonlinear optically active organic layer of 1.65 $\mu$m thickness is spin-coated on the cladding layer at 3000 rpm. The spin-coating medium is a 20% solution of a copolymer (50/50) of methyl methacrylate/4-(methacryloyloxy-2-ethoxy)-4'-nitrostilbene in trichloropropane. The organic layer is dried in a vacuum oven at 160° C. for one hour.

A photoresist layer of AZ-1518 is spin-coated on the organic layer at 4000 rpm, and the layer is exposed to 405 $\mu$m radiation (120 mJ/cm$^2$). A 0.2 $\mu$m layer of aluminum is deposited on the photoresist layer. The aluminum layer is coated with a photoresist layer, and the layer is patterned in the form of a Mach-Zehnder interferometric waveguide as represented in FIG. 1. The waveguide width is 5 $\mu$m. The Y junction channels separate and recombine at a full angle of 0.3 degrees.

The upper surface of the waveguide structure is exposed to reactive ion etching for 15 minutes under oxygen plasma conditions as previously described, to remove the multilayers down to the polysiloxane layer, except for the photoresist coated pattern. The etching cycles also remove the photoresist coating from the aluminum pattern.

The aluminum and lower photoresist layers are removed by immersion of the waveguide structure in AZ-400k developer for one minute.

The substrate and the upper surface multilayer rib pattern are spin-coated with Master Bond UV11-4M1 epoxy (Master Bond Inc.) at 2500 rpm, and the coating is cured with a mercury arc lamp discharge with 20 mw/cm$^2$ of 405 nm light for 2 minutes.

A 0.1 $\mu$m layer of aluminum is deposited on the upper epoxy cladding layer, and following the pattern procedures described above the upper electrode 25 and electrodes 26 in FIG. 2 are formed.

The waveguide structure is cleaved at opposite ends to provide two sharp faces to couple light in and out of the waveguiding organic layer.

Molecular orientation of the two polymeric waveguide sections between the two sets of electrodes respectively is accomplished by application of applied electric fields by the sets of electrodes. With electrode lengths of one centimeter, a voltage of 2-6 volts is required to switch from the transmissive to the opaque state.

The fabricated waveguide is placed in a Mettler hot stage, and the unit is raised to 140° C. at 1° C./min. A DC field of 70 V/$\mu$m and an AC voltage of 5 volts sine (10,000 t) is applied to one set of electrodes, and a variable DC voltage and an AC voltage of 5 volts sine (10,000 t) are applied to the other set of electrodes.

Objective lenses (10X) are employed to focus and couple 1.34 $\mu$m radiation (100 mW continuous wave) into the Mach-Zehnder waveguide. The output of the waveguide is passed through a 10X microscope objective, a polarizing beam splitter, and then into two optical detectors. The detector signals are transmitted to two lock-in amplifiers.

Both amplifiers are tuned for a signal at 10,000 Herz, and the variable DC voltage to the first set of electrodes is adjusted until the signals in the two amplifiers are identical.

The waveguide unit is held at 140° C. for 20 minutes under the adjusted applied fields, and the applied fields are maintained while the waveguide unit is cooled to room temperature at 1° C./minute.

During operation of the waveguide, the effected light modulation is polarization-insensitive because the voltages applied to the two sets of electrodes are balanced to achieve equal phase modulation of the TE and TM modes of transmitted light.

What is claimed is:

1. A polarization-insensitive interferometric waveguide electrooptic modulator comprising:
   a. first and second waveguide channels diverging from a common light input to form co-extensive channels, and reconverging to a common light output, wherein the waveguide channels are composed of an electrooptically responsive organic medium;
   b. a first set of spaced electrodes positioned in proximity along the first channel to facilitate the application of a horizontal electric field to the first channel organic medium, wherein the organic medium zone between the spaced electrodes has a noncentrosymmetric molecular orientation which is parallel to the direction of an applied horizontal electric field; and
   c. a second set of spaced electrodes positioned in proximity along the second channel to facilitate the application of a vertical electric field to the second channel organic medium, wherein the organic medium zone between the spaced electrodes has a noncentrosymmetric molecular orientation which is parallel to the direction of an applied vertical electric field.

2. A waveguide modulator in accordance with claim 1, wherein the organic medium is a blend of a host thermoplastic polymer and a guest organic compound which exhibits nonlinear optical response.

3. A waveguide modulator in accordance with claim 1, wherein the organic medium is a thermoplastic polymer which exhibits nonlinear optical response.

4. A thin film interferometric electrooptic waveguide device for polarization-insensitive modulation of light wave amplitude which comprises:
   a. first and second waveguide channels diverging from a common light input to form co-extensive channels, and reconverging to a common light output, wherein the waveguide channels are composed of a thermoplastic polymer medium which exhibits nonlinear optical response;
   b. a first set of spaced electrodes positioned in proximity along the first channel to facilitate the application of a horizontal electric field to the first channel polymer medium, wherein the polymer medium zone between the spaced electrodes has a noncentrosymmetric molecular orientation which is parallel to the applied horizontal electric field;
   c. a second set of spaced electrodes positioned in proximity along the second channel to facilitate the application of a vertical electric field to the second channel polymer medium, wherein the polymer medium zone between the spaced electrodes has a noncentrosymmetric molecular orientation which is parallel to the applied vertical electric field;
   d. voltage sources for the said sets of electrodes; and
   e. a coherent optical radiation means for introducing optical radiation into the waveguide device.

5. A waveguide device in accordance with claim 4 wherein the device is in further combination with a photodetector means.

6. A waveguide device in accordance with claim 4 wherein the electromagnetic radiation means is a laser beam generator.

7. A waveguide device in accordance with claim 4 wherein the channel polymer medium is a polymer with pendant side chains which exhibit nonlinear optical response.

8. A waveguide device in accordance with claim 4 wherein the channel polymer medium is a polymer with pendant side chains containing a biphenyl structure in conjugation with an electron-donating group and an electron-withdrawing group.

9. A waveguide device in accordance with claim 4 wherein the channel polymer medium is a polymer with pendant side chains containing a biphenyl structure in conjugation with an amino group and a nitro group.

10. A waveguide device in accordance with claim 4 wherein the channel polymer medium is a polymer with pendant side chains containing a stilbene structure in conjugation with an electron-donating group and an electron-withdrawing group.

11. A waveguide device in accordance with claim 4 wherein the channel polymer medium is a polymer with pendant side chains containing a stilbene structure in conjugation with an amino group and a nitro group.

12. A process for fabricating a Mach-Zehnder interferometric electrooptic waveguide device which comprises:
   (1) forming a transparent optical waveguiding thin film on a supporting substrate, wherein the thin film comprises an organic medium which exhibits nonlinear optical response, and the thin film has a configuration of first and second waveguide channels diverging from a common light input junction to form co-extensive light paths, and reconverging to a common light output junction;

(2) positioning a first set of spaced electrodes in proximity along the first channel light path to facilitate the application of a horizontal electric field to the channel organic medium;

(3) positioning a second set of spaced electrodes in proximity along the second channel light path to facilitate the application of a vertical electric field to the second channel organic medium;

(4) heating the thin film to mobilize the channel polymer molecules;

(5) applying voltage to the respective sets of electrodes to form electric fields, wherein the first channel set of electrodes induces a noncentrosymmetric orientation of polymer molecules parallel to the direction of the applied horizontal electric field, and the second channel set of electrodes induces a noncentrosymmetric orientation of polymer molecules parallel to the direction of the applied vertical electric field; and (6) cooling the thin film while maintaining the applied electric fields, and thereby providing two stable electric field-induced zones of polymer molecular orientation which exhibit second order nonlinear optical response.

13. A process in accordance with claim 12 wherein the organic medium is a blend of a host thermoplastic polymer and a guest organic compound which exhibits nonlinear optical response.

14. A process in accordance with claim 12 wherein the organic medium is a thermoplastic polymer which exhibits nonlinear optical response.

15. A process in accordance with claim 12 wherein the organic medium is a thermoplastic polymer with pendant side chains which exhibit nonlinear optical response.

16. A process in accordance with claim 12 wherein the organic medium is a thermoplastic polymer with pendant side chains containing a biphenyl structure in conjugation with an electron-donating group and an electron-withdrawing group.

17. A process in accordance with claim 12 wherein the organic medium is a thermoplastic polymer with pendant side chains containing a stilbene structure in conjugation with an electron-donating group and an electron-withdrawing group.

18. A polarization-insensitive waveguide device produced in accordance with the process of claim 12.

19. A method of modulating electromagnetic radiation which comprises:
   (1) introducing an optical beam of arbitrary polarization into a polarization-insensitive waveguide device in accordance with claim 18;
   (2) applying modulating voltage to the respective sets of electrodes to produce the same phase modulation for the transverse electric mode and the transverse magnetic mode of waveguided optical radiation; and
   (3) transmitting the modulated optical radiation to a photodetector means; wherein the light intensity of the transmitted optical radiation varies as a function of the phase shift between the two interferometric waveguiding channels of the device.

20. A method in accordance with claim 19 wherein the optical radiation is a laser beam.

21. A method in accordance with claim 19 wherein the thin film organic medium is a thermoplastic polymer with pendant side chains which exhibit nonlinear optical response.

22. A method in accordance with claim 19 wherein the thin film organic medium is a thermoplastic polymer with pendant side chains containing a biphenyl structure in conjugation with an electron-donating group and an electron-withdrawing group.

23. A method in accordance with claim 19 wherein the thin film organic medium is a thermoplastic polymer with pendant side chains containing a stilbene structure in conjugation with an electron-donating group and an electron-withdrawing group.

* * * * *